Sept. 26, 1967   I. P. FLOWERS   3,343,612
ADAPTER FOR POSTHOLE DIGGER
Filed March 19, 1965

Ira P. Flowers
INVENTOR.

BY Clarence A. O'Brien
and Harvey B. Jackson
Attorneys

United States Patent Office 3,343,612
Patented Sept. 26, 1967

3,343,612
ADAPTER FOR POSTHOLE DIGGER
Ira P. Flowers, R.F.D. 1, Corning, Iowa 50841
Filed Mar. 19, 1965, Ser. No. 441,019
8 Claims. (Cl. 173—163)

ABSTRACT OF THE DISCLOSURE

A device for adapting a power posthole digger for setting screw anchors comprising an elongated hollow tubular body having a flattened laterally enlarged first end for fixedly receiving the upper end of a screw anchor, and a second flanged end adapted for drive transmitting engagement with the drive shaft of a posthole digger.

---

This invention relates to adapters for power posthole diggers to enable screw anchors and the like to be power set into the ground.

Generally, unless specialized machines are available, screw anchors which are widely used with fences, portable buildings, silo guy wires, and elsewhere to provide a tie down, must be manually set into the ground.

It is an object of this invention, therefore, to utilize the power equipment readily available on farms, and more specifically the power take-off shaft on a tractor powered posthole digger to set screw anchors in the ground quickly and efficiently by use of the power output of an available posthole digger.

It is another object of this invention to provide a light weight, easily mountable, maintenance free, inexpensive power adapter for use with available power equipment.

It is a further object of this invention to provide an adapter for direct coupling from an existing power shaft having a supporting shoulder to minimize the shear force on coupling bolts and an adjustment screw to provide tight fit with the power shaft, or to provide for use with various size power shafts.

A still further object of the present invention is to provide a novel screw anchor adapter structure which allows rapid connection and disconnection of the adapter to an existing power output shaft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
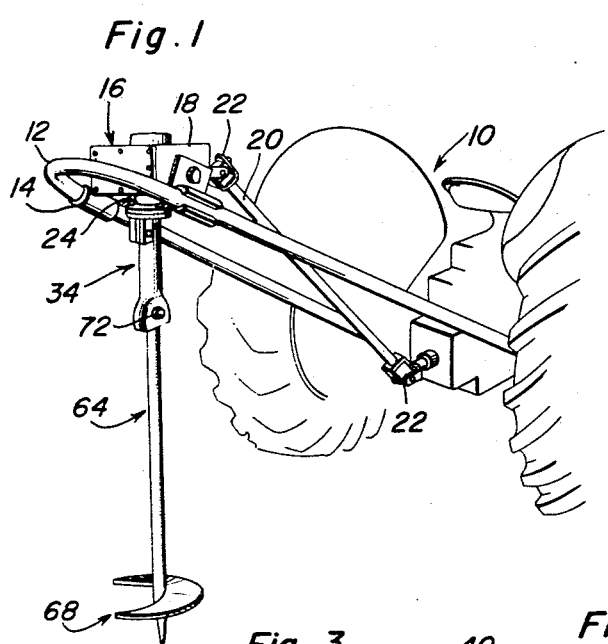
FIGURE 1 is a perspective view illustrating the present invention in operative position.
Figure 3:
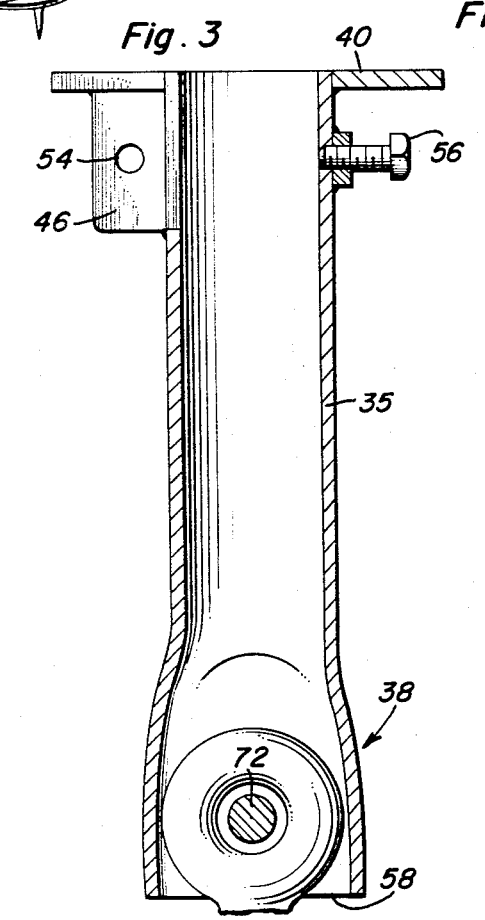
FIGURE 3 is a longitudinal cross-sectional view of the adapter comprising the present invention.
Figure 2:
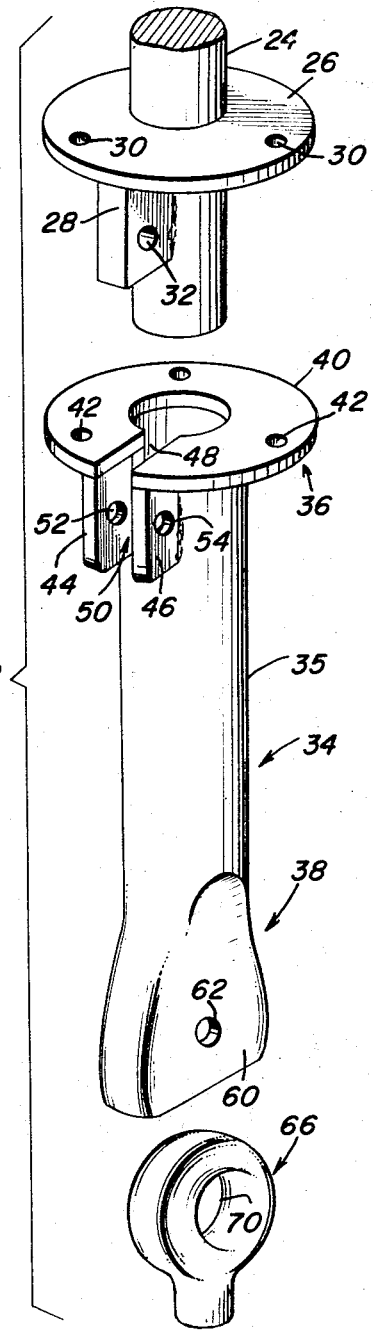
FIGURE 2 is a perspective view of the adapter comprising the present invention with the power shaft and anchor exploded therefrom.

Referring now more specifically to the drawings, numeral 10 refers generally to a tractor type vehicle and which has mounted, by bar 12 and by grippers 14, a power posthole digger attachment, generally referred to at 16. The digger attachment 16 includes power unit 18 and a conventional drive train 20, including swivel joints 22, leading to vehicle 10. The digger attachment 16 further includes power output shaft 24 which has an annular flange 26 fixed above the lower end thereof and a protruding longitudinally extending torque transmitting shoulder 28 fixed thereon below the flange 26. The flange has bolt holes 30 and the shoulder has bolt holes 32 therein to receive mounting bolts as shown in FIGURE 1. In normal usage as a posthole digger augers are mounted directly to the power output shaft 24 for rotation therewith.

Reference numeral 34 refers generally to the adapter unit of the present invention. The adapter unit 34 includes a tubular body 35, shaft mounting section 36, and a tool mounting section 38 at the respective ends thereof.

Shaft mounting section 36 includes annular flange 40 with bolt holes 42 corresponding to holes 30 in flange 26. Also included are ears 44, 46 and a slot 48 which defines a channel 50 for receiving shoulder 28 therein. Ears 44, 46 include bolt holes 52, 54 which align with hole 32 in shoulder 28. An adjustable screw 56 is threadedly mounted opposite channel 50 so as to vary the effective size of the tubular body 35 and fit for any size power output shaft, thereby allowing the adapter to have wide application.

Tool mounting section 38 includes an elongated shaft receiving opening 58 formed by flattening out the wall 60 of tubular body 35. Aligned bolt holes 62 are provided in wall 60 for a purpose to be described hereinafter.

Numeral 64 refers generally to a conventional screw anchor of the type to be used with this invention. The anchor 64 has an upper eyelet section 66 and a lower auger section 68. Eyelet section 66 has opening 70 therein, which in use provides for operative connection to the anchor for tie down purposes. When connected to the adapter unit 34, the screw anchor 64 is usually engaged by a nutted bolt 72 fastened through aligned holes 62 and 70 upon an insertion of the eyelet end 66 of the anchor 64 through the elongated opening 58. Incidentally, it will be appreciated that by flattening the section 38, not only is the opening 58 elongated for reception of the eyelet section 66, but also the flattened sides of the section 38 are positioned closely adjacent the opposite sides of the eyelet section 66 so as to transmit a substantial amount of torque and prevent an undesirable wobble between the anchor and adapter. Also, the stress forces in nutted bolt 72 are appreciably reduced.

To drive the screw anchor into the ground, the present invention is used as follows: A tool in use with the hole digger attachment 16 is removed. Adapter unit 34 is slipped on shaft 24 with the shoulder located between the ears 44 and 46 and fixed for rotation therewith by placing bolts through aligned holes 30, 42 and 32, 52, 54. The screw anchor is then attached to the lower section 38 of the adapter unit 34. After the screw anchor is set in the ground, the adapter unit is removed. This whole operation may be done quickly and efficiently by use of the instant invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for setting screw anchors in the ground comprising a power unit including a power output shaft, an elongate adapter unit adapted to be connected to said shaft, said adapter unit including a shaft mounting section and a screw anchor mounting section, and an anchor adapted to be connected to said adapter unit whereby rotation of said power output shaft is transmitted to said screw anchor through said adapter unit, said power output shaft including a mounting flange and a longitudinally extending protruding shoulder attached below said mounting flange for fixedly connecting said adapter unit to said power output shaft for rotation therewith, said shaft mounting section including a shaft receiving opening, a flange portion in surrounding relationship to said shaft receiving opening and adapted to engage said mounting flange, a shoulder receiving slot extending substantially parallel to the longitudinal axis of said adapter unit for receiving said protruding shoulder, and ear means for fixedly connecting said adapter unit with said protruding shoulder.

2. The apparatus of claim 1 wherein said screw anchor mounting section includes a substantially flattened area at the end of said unit opposite said shaft mounting section defining an elongated opening in said unit for receiving the mounting portion of said screw anchor.

3. An adapter for converting a posthole digging machine to an anchor setting machine comprising an elongated tubular body having a shaft mounting section at a first end and a tool mounting section at the other end, said shaft mounting section including a shaft receiving opening, annular flange means in surrounding relationship to said opening and extending substantially perpendicular to the longitudinal axis of said adapter, a shoulder receiving slot extending through the wall of said adapter and a portion of said flange means and substantially parallel to the longitudinal axis of said adapter, and ear means extending along said slot whereby the side walls of said slot and said ear means define a continuous surface, said tool mounting section including a substantially flattened area at the end of said adapter opposite said shaft mounting section comprising an elongated opening in said adapter for receiving a mounting portion of said anchor.

4. The apparatus of claim 1 including adjustable means for varying the effective size of the shaft receiving opening.

5. The apparatus of claim 1 wherein said ear means and said protruding shoulder include alignable bolt receiving apertures, and a locking bolt extending therethrough.

6. The apparatus of claim 2 including alignable bolt receiving apertures in said mounting section flattened area and the mounting portion of said screw anchor, and bolt means adapted for locking engagement therethrough.

7. The apparatus of claim 3 wherein said ear means include bolt receiving aperture means therethrough, said flattened area including a pair of opposed aligned bolt receiving apertures for engagement of a mounting bolt across the tool mounting section.

8. An adapter for converting a posthole digging machine to an anchor setting machine comprising an elongated tubular body of a constant cross-section throughout substantially the full length thereof, a first end of said tubular body having the diametrically opposed wall portions thereof inwardly flattened into closely spaced parallel relation to each other so as to define, at right angles thereto, lateral enlargements producing a narrow elongated anchor receiving socket, a pair of aligned bolt receiving apertures in said flattened portions, the second end of said tubular body having an annular flange affixed thereto and projecting perpendicularly outward therefrom for a major portion of the periphery of said second end, and a plurality of bolt holes extending through said flange parallel to the tubular body, said second end of the tubular body defining an outwardly opening socket.

References Cited
UNITED STATES PATENTS

| | | | |
|---|---|---|---|
| 870,696 | 11/1907 | Stetler | 287—129 |
| 1,109,836 | 9/1914 | Hanson | 287—130 |
| 2,320,612 | 6/1943 | Kandle | 173—163 |
| 2,703,479 | 3/1955 | Richardson | 173—132 |
| 3,086,799 | 4/1963 | Weidman | 287—52.05 |
| 3,148,510 | 9/1964 | Sullivan | 173—44 |
| 3,148,739 | 9/1964 | Mattingly et al. | 61—53.68 |

FRED C. MATTERN, JR., *Primary Examiner.*

L. P. KESSLER, *Assistant Examiner.*